United States Patent

[11] 3,610,605

| [72] | Inventor | Kenneth T. Cornelius<br>Potomac, Md. |
|---|---|---|
| [21] | Appl. No. | 27,580 |
| [22] | Filed | Apr. 13, 1970 |
| [45] | Patented | Oct. 5, 1971 |
| [73] | Assignee | The United States of America as<br>represented by the Secretary of the Army |

[54] SHOCK MITIGATING DEVICE
14 Claims, 2 Drawing Figs.

[52] U.S. Cl. .......................................................... 267/64 A,
213/43, 267/126
[51] Int. Cl. .....................................................B60g 11/26,
F16f 5/00
[50] Field of Search........................................... 267/64, 64
A, 64 B, 65, 126; 188/311; 213/8, 43, 273

[56] References Cited
UNITED STATES PATENTS

| 2,833,379 | 5/1958 | Matthews et al.............. | 188/311 |
| 2,956,796 | 10/1960 | Devillers ...................... | 267/65 R |
| 2,965,372 | 12/1960 | Cavanaugh.................... | 267/126 |
| 3,012,769 | 12/1961 | Smith ............................ | 267/64 A |
| 3,100,635 | 8/1963 | Bougeard ..................... | 267/65 R |
| 3,164,381 | 1/1965 | Tuczek.......................... | 267/64 B |
| 3,182,987 | 5/1965 | Price et al..................... | 267/64 A |
| 3,188,072 | 6/1965 | Wustenhagen et al........ | 267/64 A |
| 3,285,596 | 11/1966 | Burgert ........................ | 267/64 A |

*Primary Examiner*—Drayton E. Hoffman
*Attorneys*—R. S. Sciascia and Q. E. Hodges ABSTRACT: A shock absorber employing two opposing preloaded springs acting on opposite faces of a piston so that one of the springs will always oppose any motion of the piston while the other spring is prevented from aiding motion. Motion of the piston displaces fluid in a hydraulic system internal to the piston. The displaced hydraulic fluid opposes the return motion of the piston under the force of the compressed spring and allows the device to assume a new equalibrium position and act as an effective shock and vibration isolating mount at the new position.

INVENTOR.
KENNETH T. CORNELIUS
BY *Hodges*
ATTORNEY

INVENTOR.
KENNETH T. CORNELIUS 3,610,605

SHOCK MITIGATING DEVICE

The invention described herein may be manufactured and used by or for the Government of the United States of America for Governmental purposes without the payment of any royalties thereon or therefor.

SUMMARY AND BACKGROUND

The purpose of this invention is to provide shock protection for both equipment and personnel against the effects of sudden violent motions of which a ship's response to mine attack is an example. More specifically, this invention resides in a shock absorber capable of absorbing shock in two directions and which can assume equilibrium positions at which the device is effective as a vibration isolating mount. Previous methods of absorbing shock in two directions have generally utilized a cylinder with a piston separating the cylinder into two chambers and a communication channel between the two cylinder sections. Movement of the piston towards one section forces a fluid from that section into a reservoir or into the other section through the communication channel. Other methods of absorbing shock in two directions utilized counter balanced springs which hold the item to be protected in an equilibrium or zero position until displaced. After the displacing force is removed, the springs return the system to its equilibrium or zero position. Such methods either introduce the undesirable effect of producing viscous damping, or a resistance force dependent of the rate at which the displacement occurs, or requires the shock absorber return to a predetermined zero position after the force is dissipated. The present invention avoids these undesirable effects by utilizing preloaded springs presenting a force to oppose any displacement of the piston which is independent of the rate at which the displacement occurs, and a separate hydraulic system isolated from the resisting spring which prevents the displaced spring from returning the displaced piston to the position it occupied when the shock force was applied.

It is, therefore, an object of this invention to provide a shock absorber which presents a force to oppose any displacement, which force is independent of the rate at which the displacement occurs.

Another object of this invention is to present a shock absorber which acts in two directions and which utilizes preloaded springs.

Another object of this invention is to present a shock absorber which can assume a new equilibrium position and act as an effective shock and vibration isolating mount at the new position.

These and other objects will become apparent from the following detailed description of the invention.

DESCRIPTION OF THE PREFERRED EMBODIMENT

Figure 1:
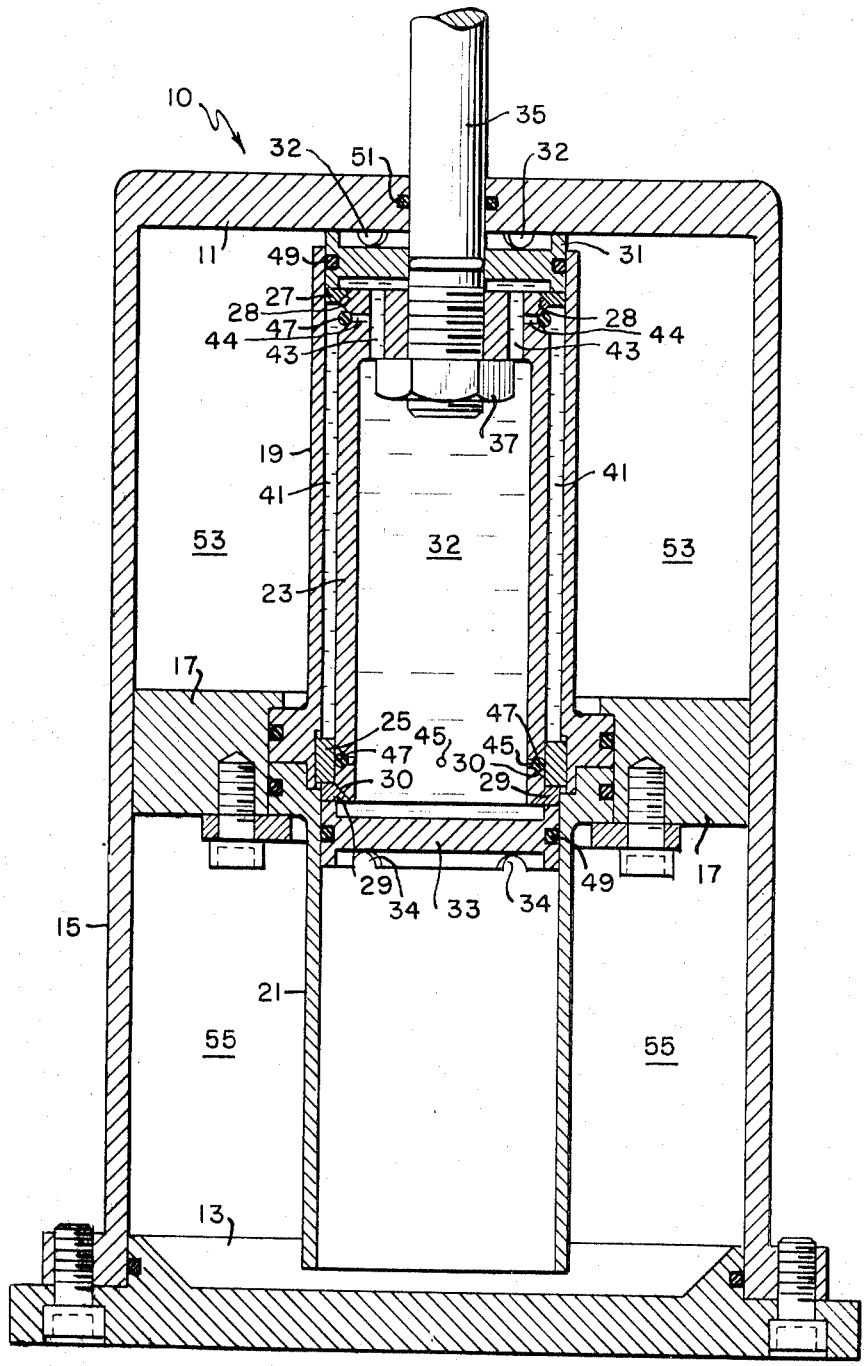
FIG. 1 shows a section of the cylindrical shock absorber taken through a center line along its axis. The shock absorber piston is shown at one of its points of extreme displacement.
Figure 2:
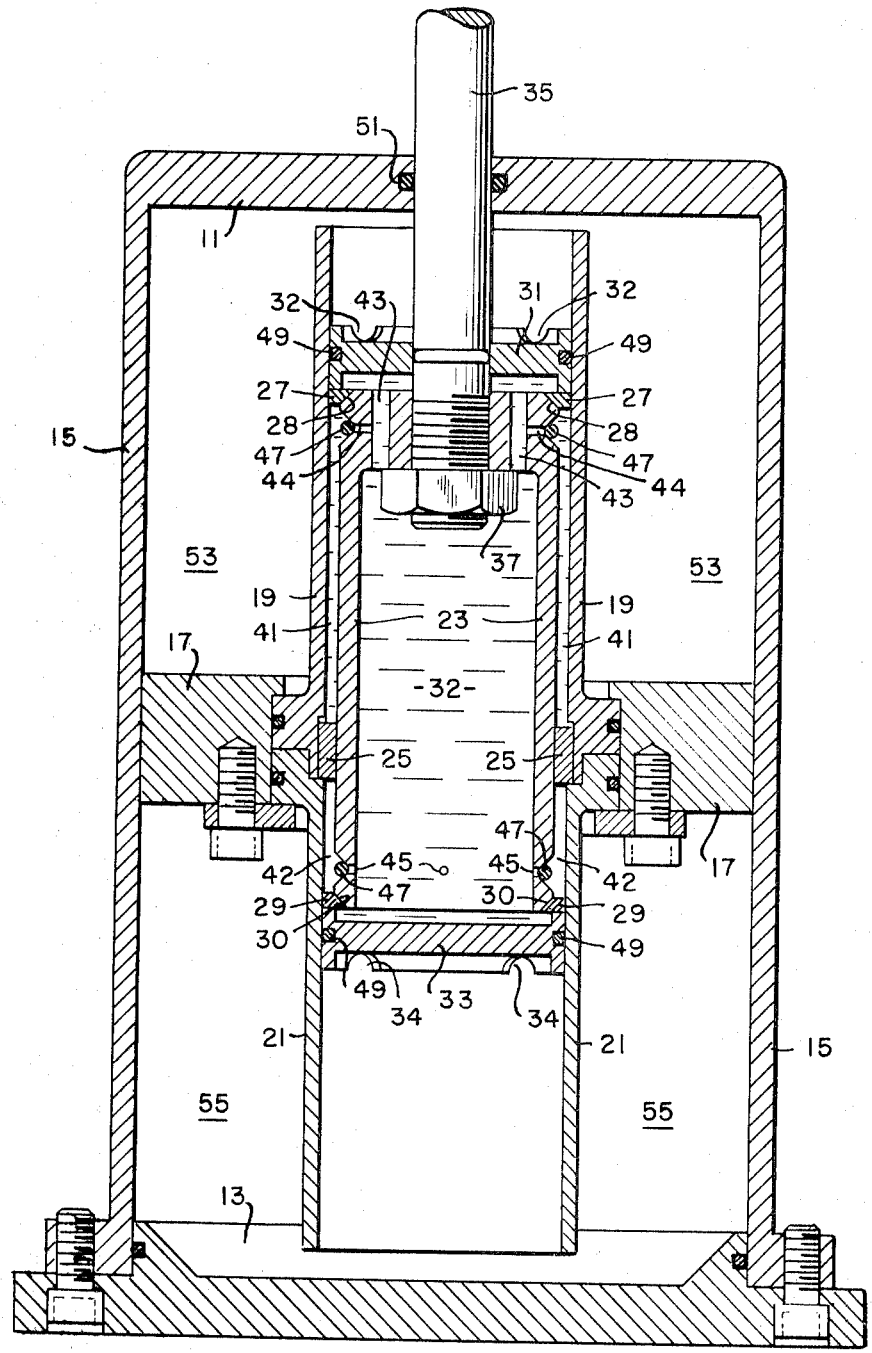
FIG. 2 shows the shock absorber in cross section as in FIG. 1 and after a force has displaced the piston to a position intermediate its two points of extreme displacement.

FIGS. 1 and 2 show a preferred embodiment of the shock absorber in a vertical position with respect to the conventional point of view for the sheet of drawings. The shock absorber is referred to in this position as having an upper and a lower portion. However, this shock absorber is not limited to the vertical position and may be used in any position; the vertical position is merely chosen to facilitate the description of the preferred embodiment.

Referring to FIG. 1 the present invention includes shock absorber body 10 comprising the top end plate 11, bottom end plate or base 13, cylindrical sidewall 15, annular bulkhead 17, dividing the interior of the shock absorber into two sections, upper cylinder assembly 19 and lower cylinder assembly 21. Centrally mounted within the shock absorber body 10 and held in place by annular bulkhead ring 17, there is a cylindrical valve body 23 slidably mounted within the cylinder formed of the upper cylinder and lower cylinder assemblies 19 and 21.

Annular partition ring 25 represents a sealing surface to valve body 23 and is mounted for small axial movements within cylinder assembly 19. The valve body is held in alignment within the cylinder assembly by the annular partition ring 25. At the upper end of the valve body is upper annular valve 27 and at the lower end of the valve body is lower annular valve 29. Each annular valve 27 and 29 is slidably mounted within the cylinder assembly and aligned with the cylinder wall and its respective mating surface 28 and 30 on the valve body. Within the cylinder assembly and at opposite ends of the valve body 23 are the upper load piston 31 and a lower load piston 33. Upper and lower load pistons 31 and 33 are free pistons and are mounted to axially slide within the cylinder assembly. Rod 35 extends through the upper plate 11 of shock absorber body 10 and is threadably attached to the valve body 23 and fixed in place by fastening nut 37. Valve body 23 contains within it a fluid filled cavity 32. This cavity communicates with an annular space 41, interposed between valve body 23 and the cylinder wall of cylinder assembly 19, through passageways 43, 44 and 45. Passageway 43 connects the valve cavity with passageways 44 and the upper end of valve body 23. Passageways 44 and 45 are sealed by O-rings 47. O-rings 49 seal the upper and lower load pistons within the cylinder assembly and O-ring 51 seals the rod within the upper shock absorber plate 11. The shock absorber body and interior part are made generally of a hard metal except for the seal O-rings which are made of generally resilient material such as rubber.

Enclosed by the cylinder assembly 19 and the exterior wall 15, annular plate bulkhead 17 and upper plate 11 is an annular upper pressure chamber 53 pressurized with air. Similarly, enclosed by lower cylinder assembly 21, shock absorber wall 15 annular bulkhead 17 and lower end plate 13 is annular lower chamber 55. The upper chamber and the lower chamber are pressurized with air and exert a spring force against the upper load piston and lower load piston respectively at all points in the travel of the pistons within the cylinder assembly. Semicircular ports 32 and 34 are cut in the flanges of load pistons 31 and 33, respectively. These ports allow the pressurized air in chambers 53 and 55 to communicate with the faces of the respective load pistons 31 and 33 when the load pistons abut their respective end plates 11 and 13. FIG. 1 shows the shock absorber at the extreme up position. At this position, upper load piston 31 abuts the interior of upper end plate 11. The air spring 53 communicating with the piston 31 through ports 32 forces upper load piston 31 against upper valve 27 which is thereby forced against valve body 23 effecting a seal at annular surface 28. Similarly, the air spring 55 through ports 34 forces lower load piston 33 against lower valve 29 which is thereby forced against valve body 23 effecting a seal at annular surface 30.

OPERATION

When a downward force is applied to rod 35, it is moved downward in response. Valve body 23, which is threadly and fixedly attached to rod 35, is forced downward by the movement of rod 35. Resisting the movement of the valve body is the spring force exerted on the lower load piston 33 by the air under pressure in lower chamber 55 and in the lower cylinder assembly 21. The air spring present in upper chamber 53 and cylinder assembly 19 exerts a spring force on upper load piston 31 forcing it down against upper valve 27 and forcing upper valve 27 to axially slide downward in the cylinder behind valve body 23. However, upper load piston 31 is prevented from exerting an aiding force against the valve body 23 by the fluid under pressure in annular space 41, as hereinafter described.

The volume of annular space 41 between the partition ring 25, cylinder assembly 19, valve body 23 and upper valve 27 will decrease as valve body 23, followed by upper valve 27, under the force of the air spring 53, moves downward. The valve body by its movement downward result in the decreasing annular space 41 and will pressurize the fluid in annular space 41. Fluid under pressure will be expelled from this annular space 41 between upper valve 27 and surface 28 and through passageways 43 into the fluid cavity 32 as the valve body moves downward. As shown in FIG. 2, a new annular space 42 will be formed in the lower cylinder assembly 21 between cylinder assembly 21, valve body 23, lower valve 29, and partition ring 25. The fluid under pressure will be pumped from the fluid cavity 32 through check valve 47 into the new annular spaced 42 formed in the lower cylinder assembly. As valve body 23 is displaced downward the pressurized fluid in annular space 41 exerts a force upon upper valve 27, forcing the upper valve against upper load piston 31 and displacing the upper valve away from valve body 23. The spring force of upper chamber 53 exerts a force against the upper load piston, counter to the force of the fluid in annular space 41, against upper valve 27, and holds the upper load piston 31 against the upper valve 27. As the valve body moves downward, the upper chamber spring 53 forces the upper valve 27 and piston 31 to tend to follow the valve body 23, but the force exerted by the fluid in annular space 41 upon upper valve 27 maintains the upper valve away from contact with the valve body and lagging it relative to the instantaneous displacement of the valve body downward. Upper valve 27 follows the downward travel of valve body 23 but is maintained at a lagging position at a point where the force of the fluid upon the upper valve 27 is counterbalanced by the force of the upper chamber spring upon piston 31. Upper valve 27, interposed between valve body 23 and upper load piston 31 then maintains the upper load piston away from valve body 23 and prevents the upper chamber spring 53 from exerting a following force on valve body 23.

When the downward force exerted on rod 35 is removed the air spring of pressurized chamber 55 will force lower load piston 33 against valve body 23 forcing it back towards its initial position as shown in FIG. 1. As valve body 23 moves back the annular space 42 between lower valve 29, partition ring 25, valve body 23 and lower cylinder assembly 21 will decrease in the same way that the annular space 41 decreased when, under load, valve body 23 moved downward. As valve body 23 moves back, decreasing annular space 42 and pressurizing the fluid in 42, the force of the spring in the lower load chamber 55 will decrease along with the retrogressive displacement of lower load piston 33 and valve body 23. When the point is reached where the force of the air spring in lower chamber 55 is equal to the force exerted by the fluid in annular chamber 42 upon lower valve 29 and against lower load piston 33 the system will come to rest at some position such as that shown in FIG. 2 and at this point a new equilibrium position will be established and the shock absorber acts as a vibration isolation mount and absorbs vibrations of small amplitudes over a range of many cycles and through the absorbent force of air springs of chambers 53 and 55. To absorb small amplitudes of vibration partition ring 25 can move axially and compensate for any small changes in the axial position of the load pistons, maintaining the respective volumes of annular spaces 42 and 41 substantially constant and thereby allowing the shock absorber to remain substantially in equilibrium.

When an upward force is exerted on push rod 35 the valve body 23 will be forced against upper load piston 31 through upper annular valve 27. As valve body 23 moves up the volume of annular space 42 will decrease forcing the hydraulic fluid out between lower annular valve 29 and surface 30, maintaining the lower annular valve 29 and the lower load piston 33 lagging behind the travel of valve body 23 and balanced between the force of the hydraulic fluid in annular space 42 and the force of the air spring of lower chamber 55. In this way the lower air spring of chamber 55 will not aid the upward movement of valve body 23. As valve body 23 moves upward it will be resisted by the air spring of upper pressurized chamber 53 exerted on upper load piston 31. This force will be exerted on valve 27 and downward upon valve body 23 resisting the upward moving force applied to rod 35. As valve body 23 moves up, annular space 41 will be reformed. The fluid under pressure from annular space 42 will flow out between lower valve 29 and the surface 30 back in to the valve cavity 29 where it will flow out through passageway 44 and check valve 47 into the new annular space 41 being reformed as valve body moves upward. when the upward force applied against push rod 35 is removed the valve will once again assume a new equilibrium position as it did when the downward force was removed.

The illustration of the preferred embodiment discussed here utilizes air springs. Air springs are not necessary as any type of spring which produces a force dependent on displacement can be used (as it would be in many applications where air would not present a suitable material). The essential features of this device is that one of the springs, the spring aiding the motion of the shock absorber is effectively disabled at the proper time while the spring resisting the motion and absorbing the shock is enabled to perform that function.

What is claimed is:

1. A double acting shock absorber comprising:
   a body member;
   a first means mounted for movement in said body in response to shock applied to the sock absorber;
   second means opposing the movement of said first means in a first direction;
   third means opposing the movement of said first means in a second direction; and
   fourth means actuated by the movement of said first means to neutralize the effect of said second means when the movement of said first means is opposed by said third means and to neutralize the effect of said third means when the movement of said first means is opposed by said second means.

2. Shock absorber of claim 1 wherein said second and third means are springs.

3. The shock absorber of claim 2 wherein said springs are air springs.

4. The shock absorber of claim 1 wherein said fourth means is a hydraulic system.

5. The shock absorber of claim 4 wherein said hydraulic system is a closed system.

6. A shock absorber of claim 5 wherein said body member contains a partition, said partition dividing said body member into an upper chamber and a lower chamber, said partition having a central opening and containing therein a sleeve secured to said partition and extending into each of said chambers, said hydraulic system being mounted within said sleeve.

7. A shock absorber of claim 6 wherein said first means includes a valve body slidably mounted in said sleeve and connected to receive the force being applied to said shock absorber;
   a first load piston slidably mounted in said sleeve and adjacent a first end of said valve body;
   a second load piston slidably mounted in said sleeve and adjacent a second end of said valve body, said second end being opposite to said first end; and interposed between said first load piston and said valve body is a first valve means and interposed between said second load piston and said valve body is a second valve means.

8. The shock absorber of claim 7 wherein hydraulic system is responsive to sliding movement of said valve body within said sleeve.

9. The shock absorber of claim 1 wherein said first means includes a valve body, a first load piston mounted at one end of said valve body, a second load piston mounted at a second end of said valve body, said first end being opposite to said first end.

10. The shock absorber of claim 9 wherein interposed between said first load piston and said valve body is an annular valve and interposed between said second load piston and said valve body is an annular valve.

11. The shock absorber of claim 8 wherein a partition ring is mounted within said sleeve, said partition ring effecting a seal with the adjacent surface of said valve body;
- a first annular space formed by said first valve means, said cylindrical sleeve, said valve body and a first surface of said partition ring;
- a second annular space formed by said cylindrical sleeve, said valve body, said second valve means and a second surface of said partition ring;
- said valve body having a hollow interior and communications means between said valve body interior and the first and second annular spaces;
- said communication means being at each end of said valve body and said communication means including a plurality of circumferentially spaced openings arranged around said cylindrical valve body;
- check valve means arranged to block said circumferential communication means whereby said check valve means allows flow from said valve body interior to said first and second annular spaces; and
- said hydraulic system containing hydraulic fluid, said annular spaces containing said hydraulic fluid and said valve body interior communication means containing said hydraulic fluid.

12. The shock absorber of claim 11 wherein said hydraulic system is responsive to the movement of said valve body, movement of said valve body against the force of said third means forcing said hydraulic fluid from said first annular space, through an opening between said first valve means and said valve body and into said valve body, movement of said valve body forming said second annular space and forcing said hydraulic fluid out through said circumferential communication means into said second annular space, said hydraulic fluid in said first annular space exerting a force on said first valve means and displacing said first valve means from said valve body in the direction of said first load piston whereby said first load piston is displaced away from said valve body and against the force of said second means.

13. The shock absorber of claim 11 wherein said hydraulic system is responsive to the movement of said valve body against the force of said second means forcing said hydraulic fluid from said second annular space through the opening between said second valve means and said valve body and into said valve body, movement of said valve body forming said first annular space; and forcing said hydraulic fluid out through said circumferential communications means into said first annular space, said hydraulic fluid in said second annular space exerting a force on said second valve means and displacing said second valve means away from said valve body in the direction of said second load piston and maintaining said second load piston away from said valve body against the force of said third means.

14. The shock absorber of claim 11 wherein said partition ring is movable in the axial direction of said sleeve in response to small axial movements of said valve body whereby said partition ring moves in the same direction as said valve body and maintains the volume of said first and second annular spaces substantially constant.